H. B. MARLIN.
VALVE.
APPLICATION FILED MAY 13, 1908.
917,333.
Patented Apr. 6, 1909.
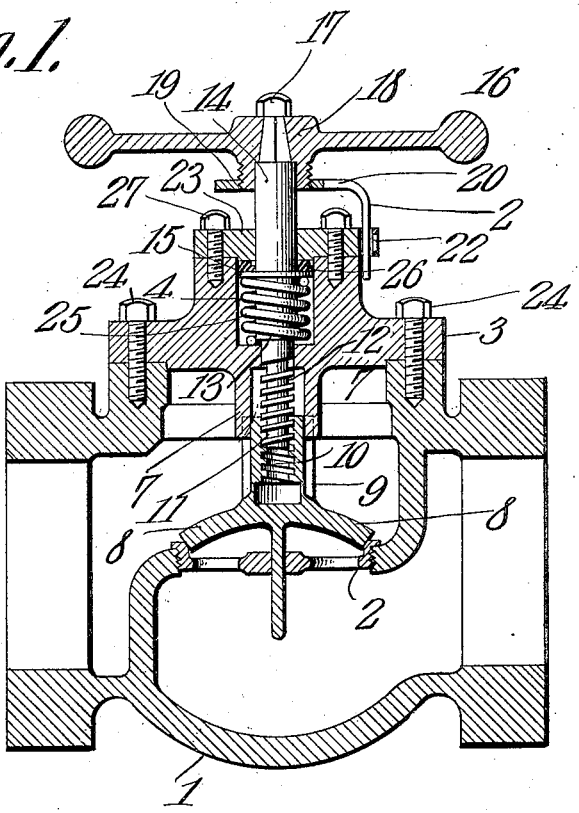
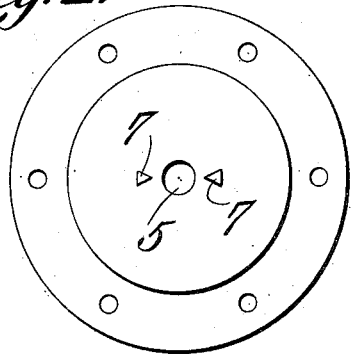
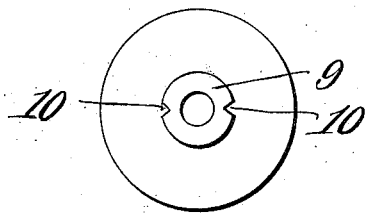
Witnesses
Inventor
Harry B. Martin.
By C. A. Snow & Co.
Attorneys

UNITED STATES PATENT OFFICE.

HARRY BENTON MARLIN, OF BARBERTON, OHIO.

VALVE.

No. 917,333.     Specification of Letters Patent.     Patented April 6, 1909.

Application filed May 13, 1908. Serial No. 432,671.

*To all whom it may concern:*

Be it known that I, HARRY B. MARLIN, a citizen of the United States, residing at Barberton, in the county of Summit and State of Ohio, have invented a new and useful Valve, of which the following is a specification.

This invention relates to valves, and has for one of its objects to provide a construction whereby the same may be kept from leaking without the use of the usual soft packing.

It is a well known fact that when it becomes necessary to reseat or renew the packing in most valves now in use, it is first necessary to close the same in order to carry out the operation.

The present invention aims to remedy this defect by employing a friction collar to surround the valve stem and to so construct the parts that the friction collar or other packing, if such be used, can be reseated or renewed without closing the valve.

With these and other objects in view, as will more fully hereinafter appear, the present invention consists in certain novel details of construction and arrangement of parts, hereinafter fully described, illustrated in the accompanying drawings, and particularly pointed out in the appended claim, it being understood that various changes in the form, proportions, size and minor details of the structure may be made without departing from the spirit or sacrificing any of the advantages of the invention.

In the accompanying drawings:—Figure 1 is a vertical section showing the device used in connection with a globe valve. Fig. 2 is a bottom plan view of the valve bonnet. Fig. 3 is a top plan view of the valve disk.

Similar numerals of reference are employed to indicate corresponding parts throughout the several figures of the drawings.

In the construction illustrated in Fig. 1, the device is shown applied to a globe indicator valve, but it is to be expressly understood that I am not to be limited to such a structure since it is obvious that the device may be applied to both angle and gate valves. The valve body 1 is internally provided with the seat 2 of the usual and well known form. The valve bonnet 3 is centrally provided with a countersunk portion extending inwardly from the outer face and forming a seat 4, the floor of which is centrally bored forming an opening 5 of less diameter than the seat. From the inner end of the bonnet, adjacent to the opening 5 depend a pair of diametrically opposite V-shaped guide stems 7. The valve proper, in the present instance, is shown as a concavo-convex disk 8, the convex surface of which is the back of the valve, and extending therefrom is a tubular stem 9, which is slidably mounted between the stems 7. This stem 9 is interiorly screw-threaded as indicated at 10, and exteriorly provided with a pair of diametrically opposite V-shaped grooves 10 adapted to engage the V-shaped guides 7, as clearly shown in Fig. 1.

The valve stem operates within the bonnet 3 and comprises a cylindrical member of suitable length, the inner end 11 of which is reduced in diameter and provided with a screw thread 12 extending to approximately the middle. The diameter of the reduced portion 11 is of a size to slidingly fit within the opening 5 in the floor of the seat 4, and by means of the opposite or larger portion 14 an annular shoulder 13 is formed adapted to rest on the floor of the seat 4, thereby limiting the inward movement of the stem. The exterior of the larger portion 14 is smooth and is intermediately provided with an annular flange or collar 15 of a diameter adapted to snugly fit within the seat 4 and the function of which will presently appear.

The outer end of the stem is provided with a conical head over which fits the hub 18 of the usual hand wheel 16 secured thereto by means of a nut 17. The inner portion of the hub is exteriorly provided with a screw thread 19 which operates in a threaded opening formed in an indicator disk 20 having an inward projection 21.

A cap 23 of a diameter equal to the outer end of the bonnet 3 is centrally provided with an opening for the reception of the valve stem, and is further provided with a lateral extension 22 having a suitable slot formed therein for the projection of the indicator disk.

In assembling the parts, the valve disk 8 is first placed in position in the seat 2. The bonnet 3 is then secured to the valve body 1 by means of bolts or screws 24 entering registering openings formed in the bonnet and body. A helical spring 25 adapted to fit within the seat 4 surrounds the inner half of the enlarged portion of the valve stem, its terminals abutting the floor of the seat 4 and one face of the collar 15. The reduced or threaded portion of the stem is screwed into the threaded stem 9 of the valve disk 8 and a friction ring 26 slipped over the outer end of the valve stem and of a diameter adapted to tightly fit within the seat 4 and rest upon one face of the collar 15. The function of the ring is to substitute for the usual packing. The cap 23 is now placed over the valve stem and secured to the outer end of the bonnet by means of bolts 27 entering registering openings formed in the cap and bonnet. During the operation of tightening the cap, the inner face of the latter contacts with the friction ring and forces, through the collar 15 and against the action of the spring 25, the valve disk 8 into the seat 2.

From the foregoing it is obvious that when the parts are in the position shown in Fig. 1, by turning the hand wheel 16 in the usual way, the valve disk 8 will move in a vertical direction on the guides 7.

Should it be desired to readjust or renew the packing ring 26, the same can be done while the valve is open, by operating the valve stem until the end of the tubular stem 9 engages the inner surface of the bonnet. The shoulder 13, by its engagement with the floor of the seat 4, prevents the valve stem from dropping down to seat the valve when the cap 23 is removed.

What is claimed is:—

The combination with a valve casing, of a valve therein having an interiorly threaded tubular stem rising from the back thereof, a valve-operating stem comprising a non-traveling screw engageable with the aforesaid tubular stem, and having a shoulder, a bonnet having a bore in which the valve-operating stem works, and said bore having a shoulder which is engageable by the shoulder of the valve-operating stem to limit its inward movement, a removable cap inclosing the bore of the bonnet, a packing ring mounted on the valve stem and engageable with the inner surface of the cap, a spring coiled around the valve stem between the packing ring and the shoulder of the bonnet bore, and guide stems depending from the inner surface of the bonnet, between which stems the aforesaid tubular stem works.

In testimony that I claim the foregoing as my own, I have hereto affixed my signature in the presence of two witnesses.

HARRY BENTON MARLIN.

Witnesses:
J. C. RHODENBAUGH,
A. H. STATT.